United States Patent [19]

Hines

[11] Patent Number: 5,614,941
[45] Date of Patent: *Mar. 25, 1997

[54] MULTI-IMAGE AUTOSTEREOSCOPIC IMAGING SYSTEM

[76] Inventor: Stephen P. Hines, 4525-B San Fernando Rd., Glendale, Calif. 91204

[ * ] Notice: The term of this patent shall not extend beyond the expiration date of Pat. No. 5,430,474.

[21] Appl. No.: 440,763

[22] Filed: May 15, 1995

Related U.S. Application Data

[63] Continuation-in-part of Ser. No. 157,885, Nov. 24, 1993, Pat. No. 5,430,474.
[51] Int. Cl.[6] ............................ H04N 13/00; H04N 15/00
[52] U.S. Cl. .................................. 348/42; 348/51; 348/54
[58] Field of Search .................................. 348/42, 44, 47, 348/48, 51, 54; H04N 13/00, 15/00

[56] References Cited

U.S. PATENT DOCUMENTS 4,062,045  12/1977  Iwane ........................................ 348/42
4,541,007  9/1985  Nagata ...................................... 348/42
5,223,925  6/1993  Hattori ..................................... 348/42
5,430,474  7/1995  Hines ....................................... 348/42

*Primary Examiner*—Tommy P. Chin
*Assistant Examiner*—Vu Le
*Attorney, Agent, or Firm*—Wagner & Middlebrook

[57] ABSTRACT

A system is disclosed for creating stereoscopic images from multiple sources from predetermined lateral directions for forming the multiple images onto a multiple image plane and converging the images into multiple superimposed images on a viewing screen. The viewing screen employs a Fresnel lens and a lenticular lensed surface with horizontal lenticules. No glasses are needed, by one or more persons, to view stereoscopic 3-dimensional images. The source of the multiple images may be multiple cameras, composite multiple image film, video signals, or computer-generated images. In one embodiment, the multiple images are projected each by a respective substantially identical lens and through a folded optical reflective system to a restricted viewing opening in the system housing.

11 Claims, 18 Drawing Sheets

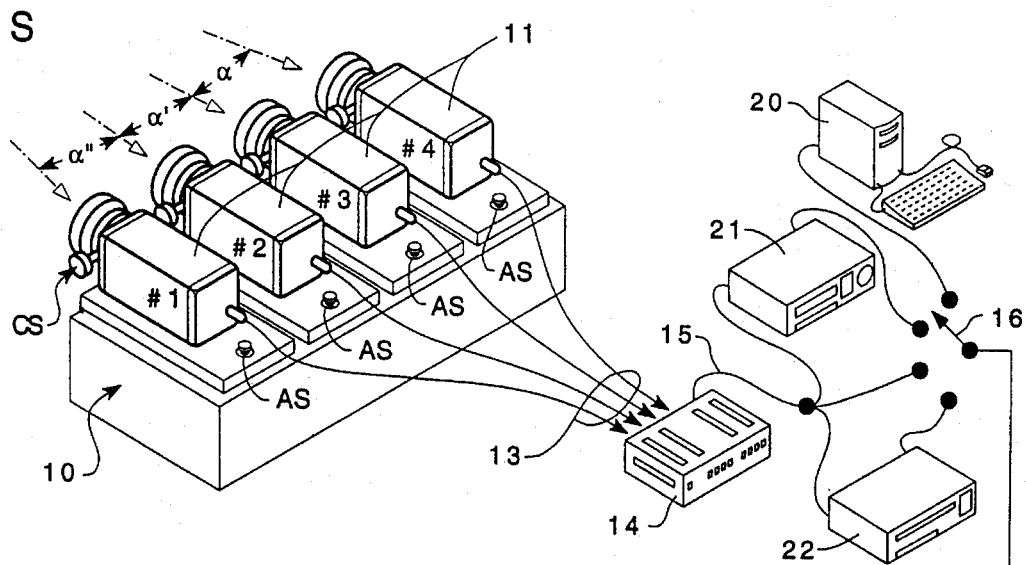
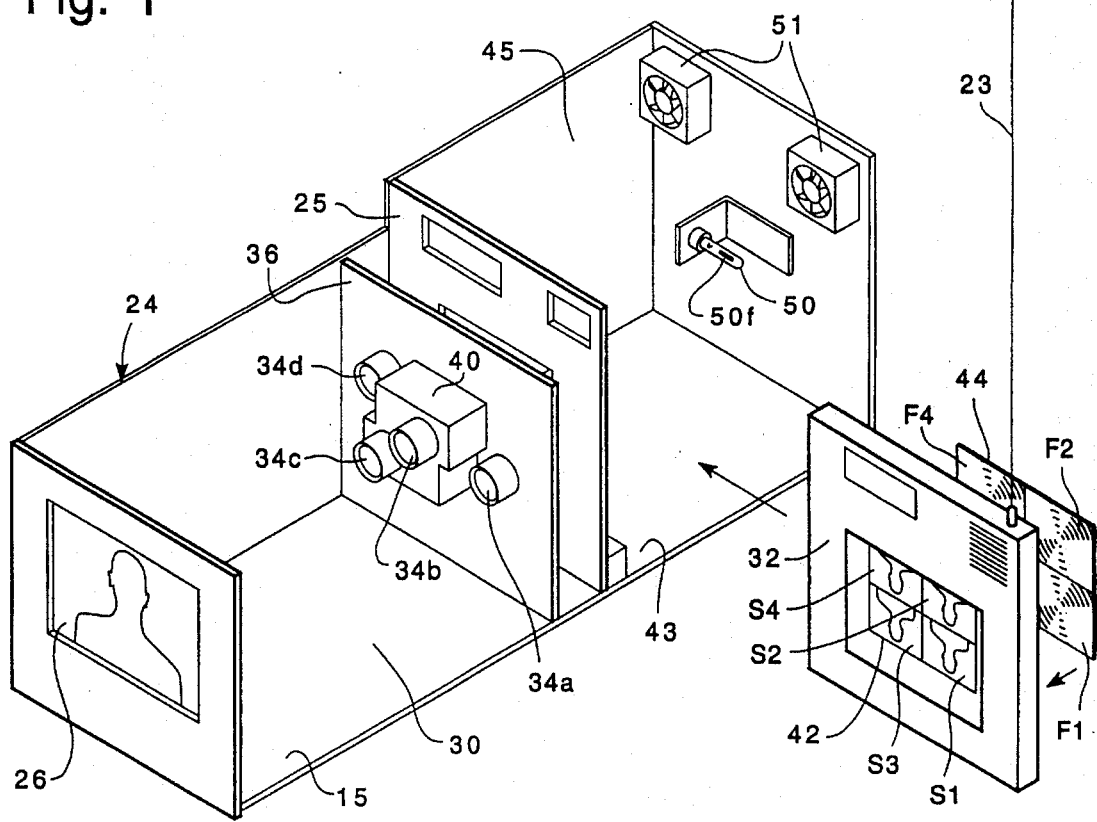
Fig. 1

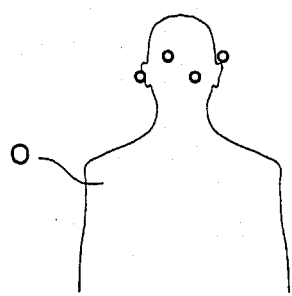 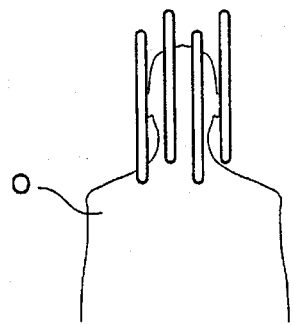 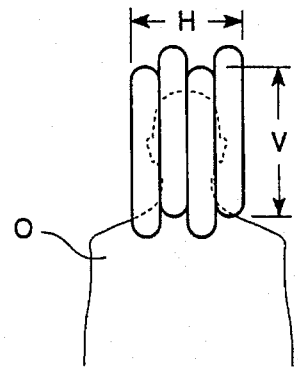
Fig. 19a  Fig. 19b  Fig. 19c
Fig. 19
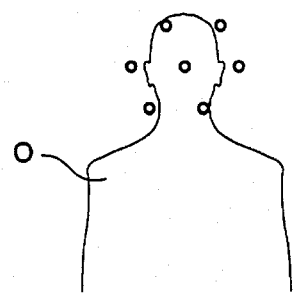 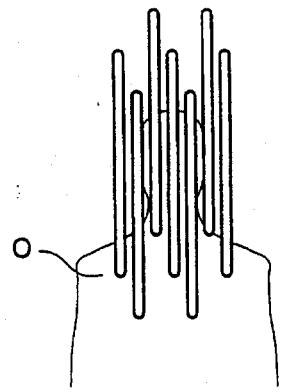 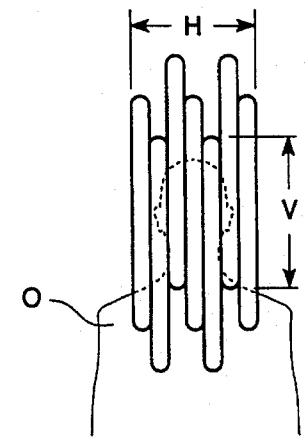
Fig. 20a  Fig. 20b  Fig. 20c
Fig. 20

MULTI-IMAGE AUTOSTEREOSCOPIC IMAGING SYSTEM

REFERENCE TO RELATED APPLICATION

This a continuation in part of application of Stephen P. Hines for AUTOSTEREOSCOPIC IMAGING SYSTEM, Ser. No. 08/157,885, filed Nov. 24, 1993, now U.S. Pat. No. 5,430,474.

BACKGROUND OF THE INVENTION

There has long been a desire for three dimensional (3-D) display of visual images for entertainment and education. Effective systems have been devised to record multiple images and record them with the required interocular spacing as is achieved in the human eye/brain system. Examples of systems for mounting and controlling multiple cameras to achieve such filming are disclosed in U.S. Pat. Nos. 4,557,570 for CAMERA ASSEMBLY FOR THREE-DIMENSIONAL PHOTOGRAPHY and No. 4,650,305 for CAMERA MOUNTING APPARATUS.

After the images are recorded, the problem of display or projection for the viewer remains. This requires the use of some type of coding or identifying the left and right images and some type of decoding by the display to insure that the left eye views only the left scene and the right eye views only the right scene. Usually this is done employing special glasses to be worn by the viewers. The glasses will provide the decoding of the projected images.

The wearing of special glasses is undesirable from the viewer's standpoint and expensive for the exhibitors.

Employing holographic technology, apparent 3-D effects have been achieved without the use of glasses. Holographic technology has, however, not been readily adapted to the computer, video, arcade game and home television industry for several reasons and does not lend itself to real-time motion video or to full color displays.

The computer market requires high resolution displays which are usually viewed by a single person sitting at a computer console. Stereoscopic or 3-D computer displays which do not require 3-D glasses have eluded development.

Liquid-crystal displays have been developed for projecting computer or video images on an overhead projector. An example of such a display is the Ovation 820C 8.4" diagonal color active-matrix liquid-crystal projection panel from Proxima Corp. of San Diego, Calif. or models QA-1260 and QA-1650 from Sharp Electronics of Japan.

Likewise, high quality, low cost, compact video cameras are now available. This makes it possible to produce multiple video images of a scene with the images combined into stereoscopic arrays which may be stored on any suitable medium, processed by a computer and displayed, employing this invention for viewing without the need for glasses.

BRIEF DESCRIPTION OF THE INVENTION

This invention relates to a three dimensional imaging system involving photography, recording, and displaying a video, or computer-generated, 3-D image for viewing, without glasses, by a single person or small group. The source of the images may be either video, recorded using the camera array of this invention or other source such as computer-generated scenes. The entire system is compatible with existing video signals and therefore can be transmitted over broadcast or cable television stations and can be viewed live in 3-D or recorded on home VCR's for later playback in 3-D.

The filming or recording portion of this invention includes a camera array with a number of similar cameras mounted on a common support with the lens system of each directed to view a common scene. Each camera is laterally displaced from the others and, in one embodiment each camera is fitted with a horizontally adjustable perspective control lens to allow each camera to encompass the same field of view while displaced laterally.

Signals from video cameras may be combined and recorded to display each camera's signal on a preselected portion of an optical screen such as a liquid-crystal display panel. There is no overlapping of images on the optical screen of the monitor portions of this invention.

Similarly, signals originating in a computer are created on a liquid-crystal display type screen of the monitor in the format required. The liquid-crystal display panels identified above are described as compatible with most IBM and APPLE computers and video equipment.

The viewing element of this system in its preferred embodiment employs a housing enclosing a rear light source, a liquid-crystal display panel on which multiple images are simultaneously displayed, a multiple path optical projection system and a rear projection screen onto which the multiple images are combined for viewing in proper 3-D registration.

The light from a source, preferably a miniature halogen lamp, is directed from the rear through a liquid-crystal (LCD) projection panel of the type described above. The liquid-crystal display panel is electrically connected to a signal source, such as a computer or video source, which provides electrical signals to the panel multiple, e.g., 2 or more different images which correspond to the same number of images filmed or recorded employing the camera array of this invention or generated by a computer. Each of the multiple images is projected via a separate lens system on to the rear projection screen from different horizontal angles. The multiple images are superimposed upon each other creating a stereoscopic effect, achieved by reason of the viewer simultaneously viewing any two of the images, both with their appropriate horizontal parallax. The screen upon which the 3-D image is displayed is a multiple-layer screen including at least:

a) a Fresnel lens;

b) a diffuser; and c) a lenticular screen with horizontal lenticules.

The Fresnel lens, within the screen, creates exit pupils from each projection lens into the viewing space at the viewer's eyes. The diffuser diffuses the light uniformly and increases the size of the exit pupils projected to the viewer's eyes. The lenticular screen, with horizontal lenticules, scatters the light vertically to eliminate any noticeable difference in the vertical position of the illumination for the viewer. Once the monitor of this invention is developed, it has become apparent that its utility may also be further enhanced where the projection lens system is utilized with a video or optical projector located at the rear of the monitor in place of the light source and the liquid crystal display removed.

A single viewer, or a small audience, in front of the monitor views a 3-D scene on the display screen with a degree of look-around capability reflecting the different camera or image source angles. No glasses or other viewing aids need be worn by the viewer or viewers. Likewise, this invention may be applied to video-arcade game displays and to systems where the image source is a film projector and film.

Described are means to produce a more compact folded optics package form of this invention in which the image viewed by the observer or observers is recessed behind a front opening facilitating light control and so that the vertical and lateral viewing positions are controlled to improve the image quality in general. Specifically this improvement insures that head movement by the observers does not produce either two dimensional images or an apparent dark screen within the viewing space.

Also described is a recessed image screen system in which the size of the front viewing opening is set during the design process to provide optimum field of view for the number of images, and number of observers.

Also a folded optical system was developed in which multiple lenses are used but all lenses may be of identical focal length and otherwise identical and interchangeable.

Additionally, in one version one light source per image is used whereby special custom field lenses are not required.

In one form, the improved system employs one or more mirrors resulting in the compact system design.

BRIEF DESCRIPTION OF THE DRAWING

This invention may be more clearly understood from the following detailed description and by reference to the drawings, in which:

FIG. 1 is a system block diagram of this invention including a partially exploded view of the monitor assembly;

FIG. 19 illustrates the exit pupils at the eyes of the observer projected by the screen optics of the projection lenses in the 4-lens version of the monitor of FIGS. 1, 2 and 3;

FIG. 20 illustrates the exit pupils at the eyes of the observer projected by the screen optics of the projection lenses in the 7-lens version of the monitor of FIGS. 17 and 18;

DETAILED DESCRIPTION OF THE INVENTION

Figure 1A:
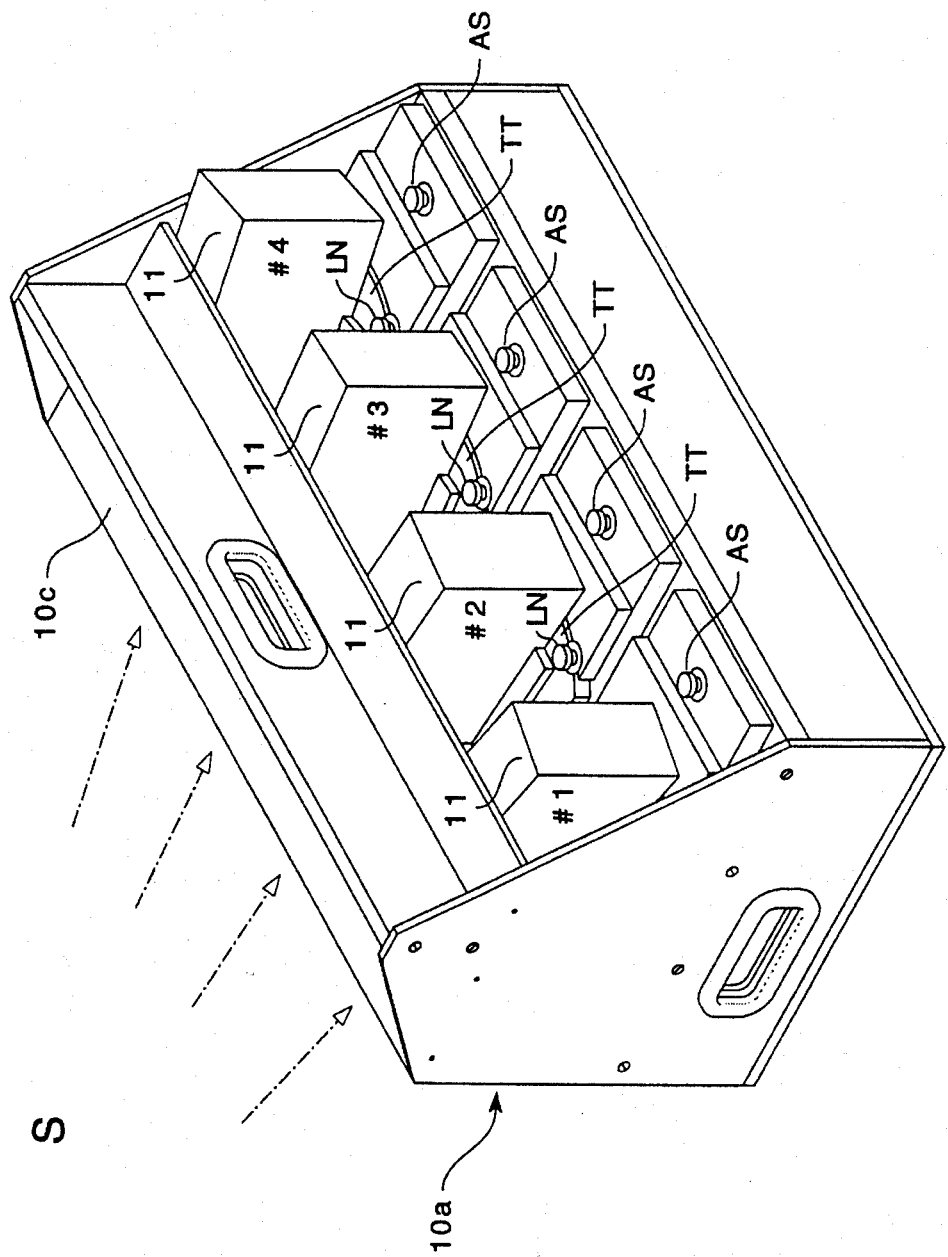
FIG. 1a is an enlarged perspective view of an alternate camera mount assembly for the system.
Figure 2:
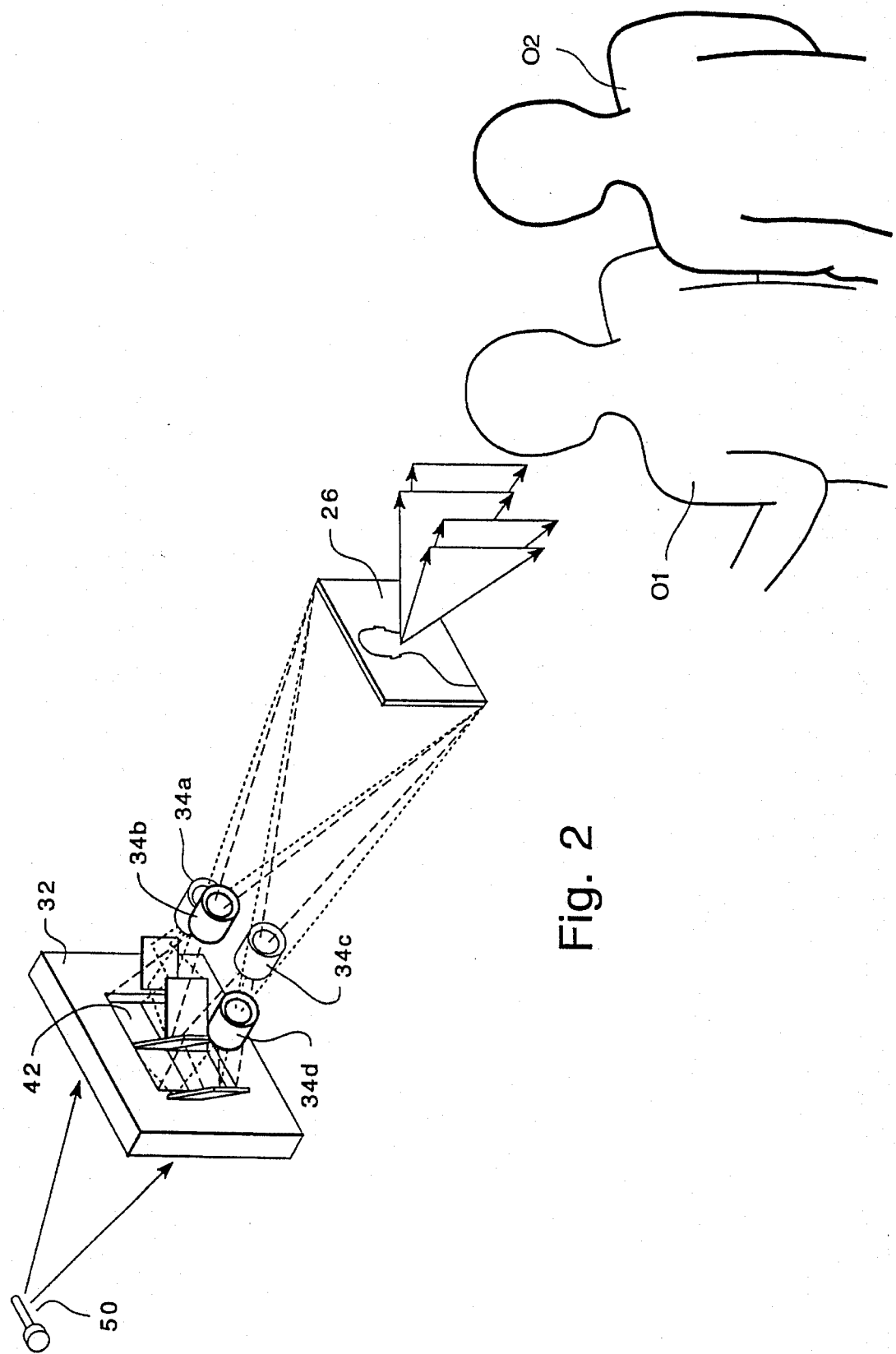
FIG. 2 is a simplified perspective view of the monitor of FIG. 1.
Figure 3:
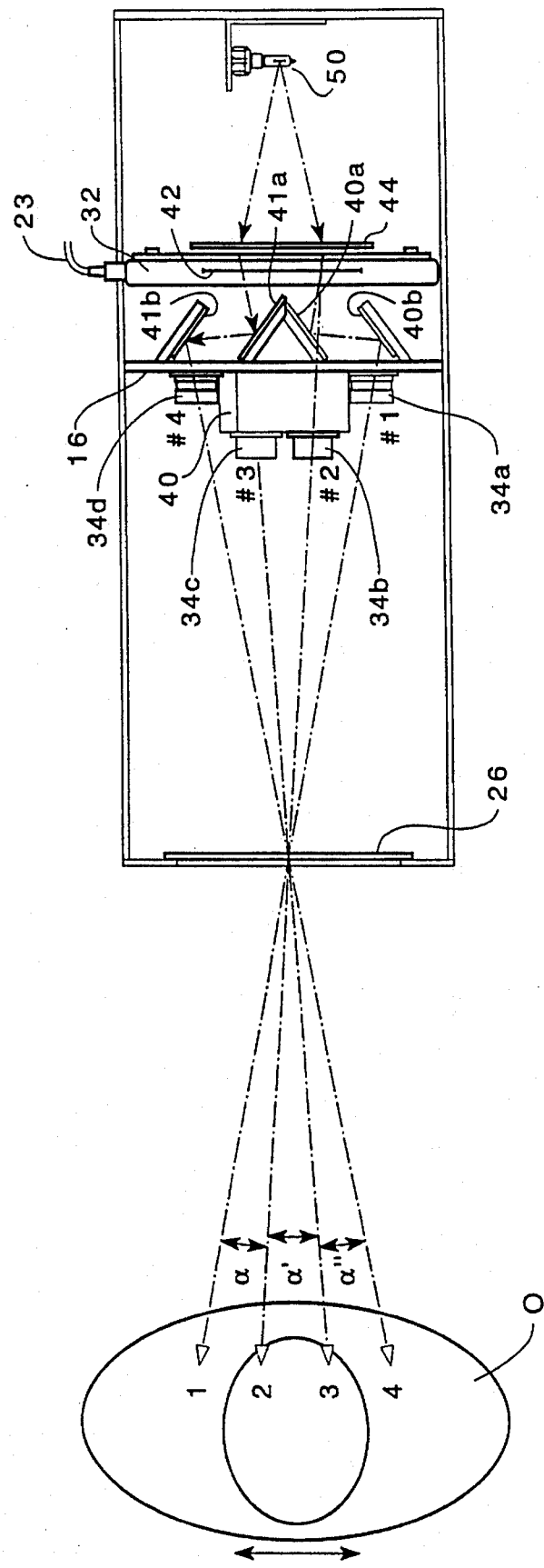
FIG. 3 is a top plan view of the monitor of FIG. 1 with the cover removed including ray paths.

Now referring to FIG. 1 in connection with FIGS. 2 and 3 a system for producing multiple images of a common subject S in front of a camera array, generally designated 10, for display in stereo or 3-D by a viewer or group sitting in front of a monitor 24, without the need for glasses or any other aids.

The camera array 10 employs a number of similar video cameras 11 each mounted slightly off of the central axis extending to the subject S. Each camera 11 produces an image which is slightly different depending upon the distance to the subject S and the angle $\alpha$, $\alpha'$ and $\alpha''$. Electrical signals representative of the images at the image plane of each camera 11 are conducted by respective lead 13 to a signal combiner 14 such as a Panasonic Model WJ-450 video processor which combines each camera image into a two-by-two array suitable for display on a single video screen. This signal combiner 14 is of the type which is commonly used in security systems where a number of cameras are placed at different locations and their signals are conveyed to a central monitoring station to be displayed on a video screen in a two-by-two array. One security guard may then monitor four locations simultaneously. In the application of this invention, the two-by-two image array is made up of the stereoscopic nearly identical images of the subject S.

The combined signals from the cameras 11, on lead 15 are conveyed to a selector switch 16 which may be present in the system to allow the selective input of signals from alternate sources such as a personal computer 20, a video tape player 21 or a laser disc player 22 when each have a comparable signal to the output of the signal combiner 14. Whichever signal source is selected at selector switch 16 is conveyed over cable 23 to the monitor or display assembly 24 which is shown in open and partly exploded form for ease of understanding.

Figure 4:
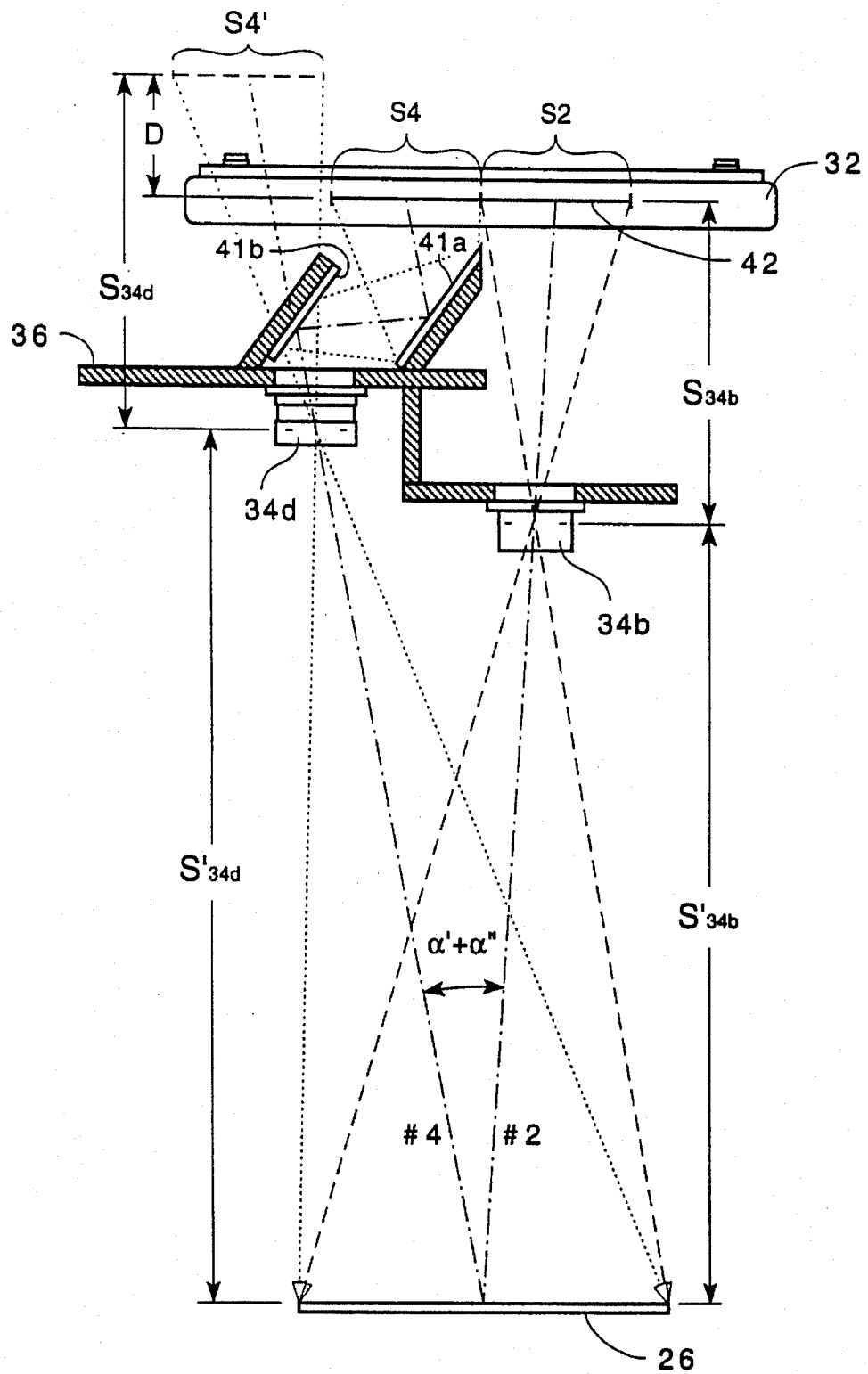
FIG. 4 is a simplified top view of the optical layout of the monitor of FIG. 1 showing one each of the two different focal length projection lenses.

The monitor 24 includes a housing 25 having a viewing screen 26 at the front of a chamber 30 on which multiple images from a liquid-crystal display unit 32 are converged upon the viewing screen 26. At the rear of the converging chamber 30 are a plurality of projection lenses, 34a–n for example 4 in number, which have a common image plane at the screen 42 of a liquid-crystal display assembly 32. The lenses 34a–n have common focal planes at the liquid-crystal screen 42 and at the screen 26, as best seen in FIG. 4.

The lens assemblies 34a–34n may be identical but in the embodiment of FIG. 1 comprise two pairs of different focal length lenses, the first pair, 34a and 34d mounted on a light barrier wall 36 and the second pair 34b and 34c mounted on a wall projection 40 which extends toward the screen 26. The lens pair 34a and 34d, in the prototype shown in FIG. 1. are 139.5 mm FL f4.5 triplet lens of the J. M. J. Optical Company Model #71610 while the lens assemblies 34b and 34c are 125 mm FL f4.5 lens, Rolyn No. 30.1387.

Behind the barrier 36 is located the liquid-crystal screen assembly 32 which is capable of displaying on its screen surface 42, black and white or color images which are received from any one of the signal sources 14, 20, 21 or 22 as conveyed via cable 23.

In FIG. 1, the liquid-crystal assembly 32 is shown exploded to the right from the housing 25. When fully assembled and with the missing sides and tops of the monitor 24 in place, the liquid-crystal assembly 32 is located in the wall between the chambers 30 and 45 behind the lenses 34a–34d.

The preferred liquid-crystal display is identified above although other sources may be used such as a multiple stereoscopic image photographic transparency. When four lens assemblies 34a–d are used, four images are displayed on the liquid-crystal display panel 42, each image has a lateral parallax corresponding to the lateral displacement of the optics such as the cameras 11 when the images are originally photographed, e.g. 3-D photography. If the source of the signal received over cable 23 is from a computer 20, a video tape reproducer 21, or laser disc player 22, the electrical signal is applied to the liquid crystal panel 42 which constitutes the multiple image plane of the system. The cooperation between the optical elements and the liquid crystal panel 42 produces multiple images arranged in accordance with the desired positions at the viewing screen 26.

Behind the liquid-crystal assembly 32, when it is in its position in housing 24, is a multiple array Fresnel lens plate 44 and a lighting chamber 45 with a high intensity lamp 50 and associated cooling fans 51. In this embodiment, the light from the lamp 50 is directed toward the multi-zone Fresnel lens 44 and the rear face of the liquid-crystal assembly 32 for rear illumination of screen 42 and projection of the multiple images which are shown as four inverted images, S1–S4 in FIG. 1, corresponding to the output of each of the individual cameras 11 or of the individual views from one of the alternate image sources.

The Fresnel lens plate 44 constitutes a mosaic of Fresnel lenses with four separate sections F1–F4, three of which may be seen, in part in FIG. 1. to form four images of the single filament 50f of the light source 50. In the embodiment of FIG. 1, the light source 50 is preferably a type halogen lamp having 150 watts or more, adequate for illuminating the liquid-crystal display panel 42 and the screen 26.

To design this rear-projection 3-D display with projected exit pupils, it was necessary to project images toward the back of a rear projection screen from different horizontal directions so that the image from each projector would be viewed from the appropriate eye position to match the camera angles.

Because currently-available liquid-crystal projection panels are somewhat limited in resolution (480×640), full use was made of all LC pixels and using a tightly-packed 2×2 image array, with no wasted image area as shown in FIG. 1.

Figure 6:
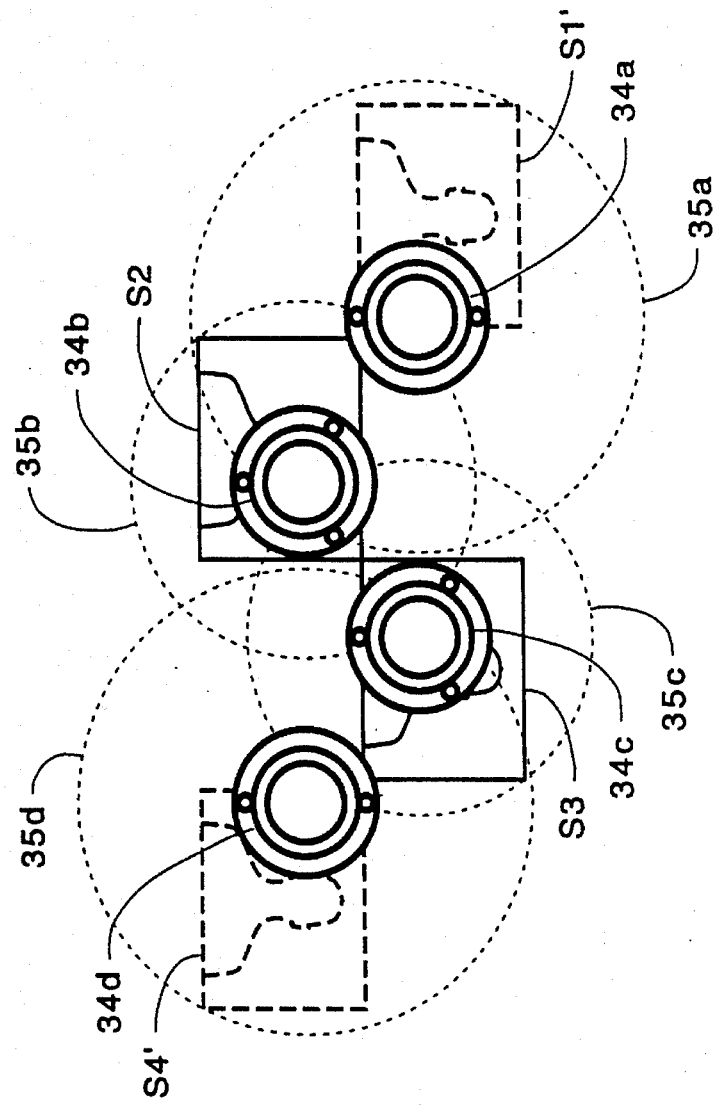
FIG. 6 is a simplified front presentation of the lens system of FIG. 1 and the field coverage of those lenses and the corresponding images.

Because two images were directly above the other, it was necessary, in this 4-image design, that one of the left two images, and one of the two right-hand images be diverted laterally, so that no image, from the point of view of the four projection lenses 34a–d, appeared to lie above another image as shown in FIG. 6. This was achieved simply by introducing the pair of periscope-type mirrors 40a & b and 41a & b of FIG. 3 in the optical path of one of the left, and of one of the right images. A prism could have provided the same function, but was not used due to the cost and weight, and it would have provided no additional utility. It was arbitrary which of the left pair S3 or S4, and which of the right pair S1 or S2, of images were diverted. It was important only that none of the images, after being reflected laterally as shown in FIG. 6, appeared to occupy the same lateral position as any other image, from the position of the lenses.

The pair of mirrors 40a & band 41a & b made the apparent images shift laterally, creating dog-legged optical paths. The mirror pairs also added path length between the liquid-crystal panel 32 and the lenses 34a and 34d, making the liquid-crystal images S1' and S4' appear to be approximately 11% (681 mm vs. 613 mm) farther away as shown in FIG. 4, and shifted outward as shown in FIG. 6.

The subtended angle is measured at the screen 26, in the lateral yaw direction, between the direct-projection lenses 34b and 34c as shown in FIG. 3. The lateral shift of lenses 34a and 34d were chosen so that α and α" approximately equal α'. All four images physically lie in a common plane 42, and must be projected, at a uniform magnification, onto a common screen 26. The increased path length in the dog-legged optical paths, for lenses 34a and 34d, relative to the direct-projection lenses 34b and 34c, was compensated for by using lenses of different focal lengths in a matching ratio of 111%.

For the first prototype, stock commercially-available lenses were used. The longitudinal increase D for images S1' and S4', and amount of lateral displacement, were adjusted as trial values in the following equation which was developed to determine the magnification by equating the magnification of both focal length lenses to each other. The optical conjugates of the lenses were expressed as a function of magnification, which had to be equal for all lenses, even though there were two different optical path lengths. Where the magnification of the longer focal length lens 34d equals the magnification of the shorter focal length lens 34b, the following equation applies:

$$[FL_{34d}(1+1/M)+[FL_{34d}(1+M)]+[FL_{34b}(1+1/M)]+[FL_{34b}(1+M)] \quad (1)$$

Where:

FL=focal length, and

M=magnification.

It may be noted from FIGS. 2, 3, 4 and 6 that the projection lenses are used off axis. Lenses were chosen with sufficient field coverage so that the quadrants of the liquid-crystal image 42 fit within the field coverage 35a–d of the lenses 34a–d.

Figure 5:
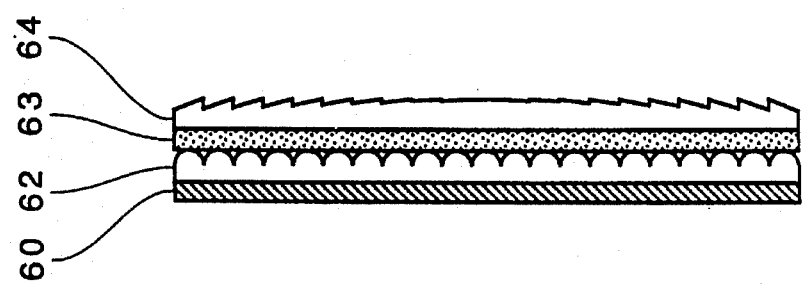
FIG. 5 is an edge view of the viewing screen of the monitor of FIG. 1.
Figure 7:
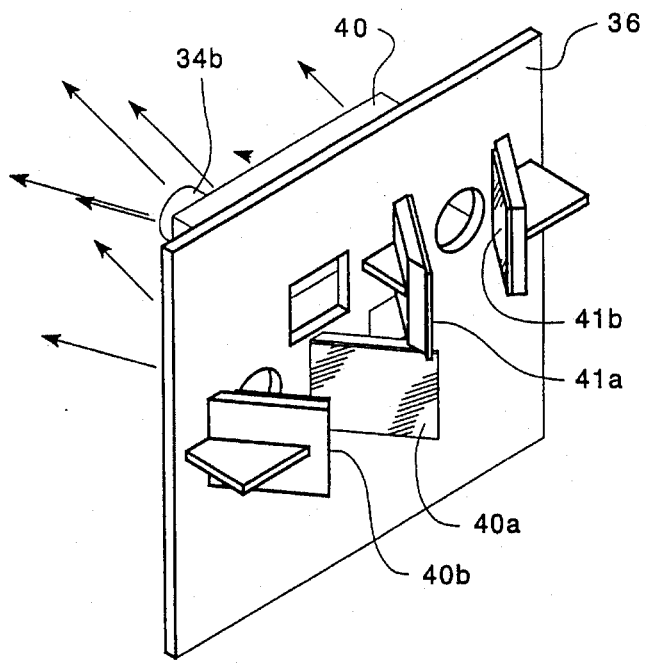
FIG. 7 is a simplified perspective view of the mirror array of the monitor of FIG. 1.
Figure 8:
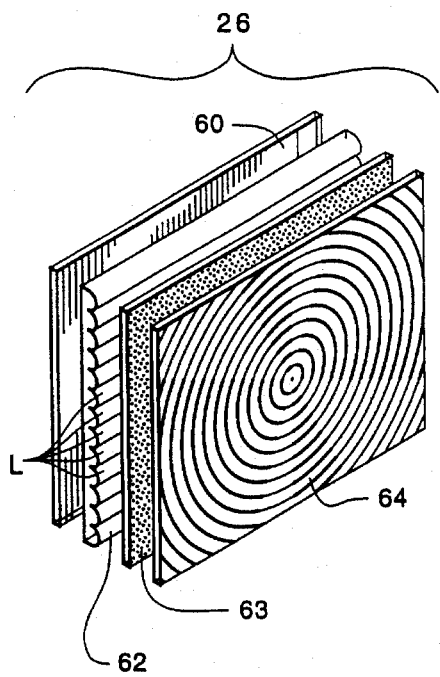
FIG. 8 is a perspective view of the multiple layer viewing screen assembly of the monitor of FIG. 1.
Figure 9:
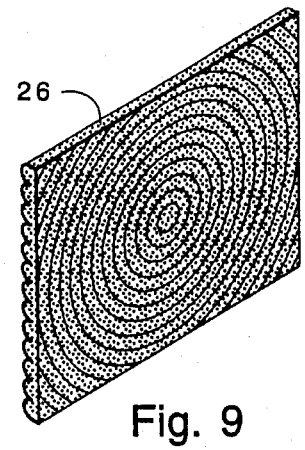
FIG. 9 is a perspective view of a single composite lens which is optically equivalent to the multiple layer viewing screen assembly of FIG. 8.
Figure 10:
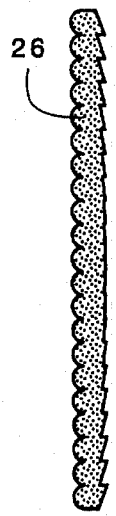
FIG. 10 is a vertical sectional view taken through the center of the screen of FIG. 9.

The difference in the vertical positions of the exit pupils at the eyes of observer O was virtually negated with the use of the horizontally-oriented lenticular screen 61 of FIGS. 5 and 8 which scattered the light inot vertical vanes within which the eyes could view 3-D images. See FIG. 19.

Figure 13:
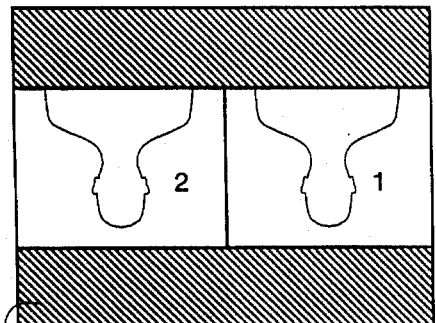
FIGS. 13 through 16 are arrays of four different image arrangements at the liquid-crystal assembly before combining for viewing in the monitor of this invention.
Figure 14:
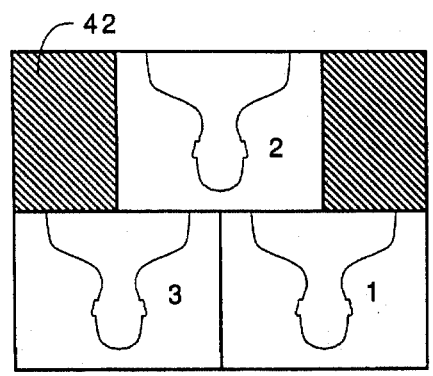
Figure 15:
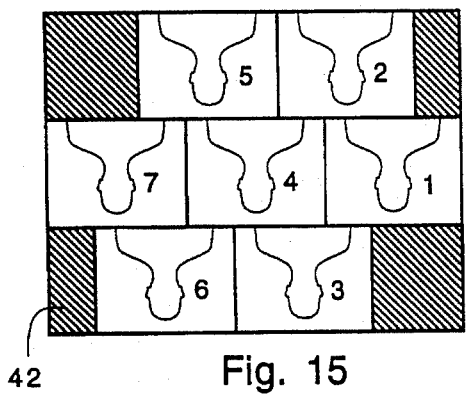

An alternate approach to using a 2×2 image array with no unused pixels, was to accept the loss of some pixels as in FIGS. 13–15 and arrange separate similar images, within the liquid-crystal panel 42, so that no two images had the same lateral position, independent of the vertical position. Two imges, FIG. 13, would be the minimum number of images required to create a stereo effect. Maintaining a 3:4 aspect ratio, typical for video and computer displays, very inefficiently uses the 3:2 ratio of the LC panel 42 wasting a large amount of the area at the top and/or bottom of the LC panel. Alternately, both images at a 3:2 aspect ratio could be projected, making full use of the PC panel area and maximizing the resolution.

FIG. 14 indicates a somewhat more efficient use of the LC panel with three images.

Figure 16:
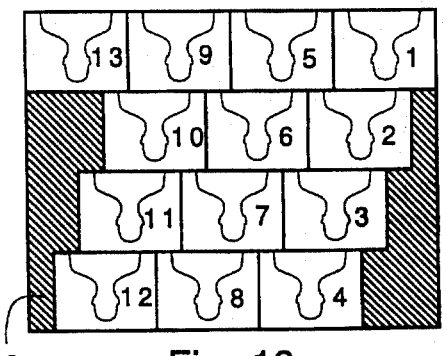

As the resolution of liquid-crystal panels improves, such as with the recently-introduced Super VGA 1024×768 resolution liquid-crystal panels, other approaches become practical as illustrated in FIGS. 15 and 16. Because none of the approaches illustrated with FIGS. 13–16 have images aligned laterally, they all have the advantage that the projection optics are simplified by allowing all projection lenses to be mounted to a common board/surface. This eliminates the need for the periscope-style pair of mirrors in the optical path. A further advantage of approaches in FIG. 15 and 16 is that by projecting more images to the screen, the transition, as the observer moves laterally, is smoother.

Figure 11:
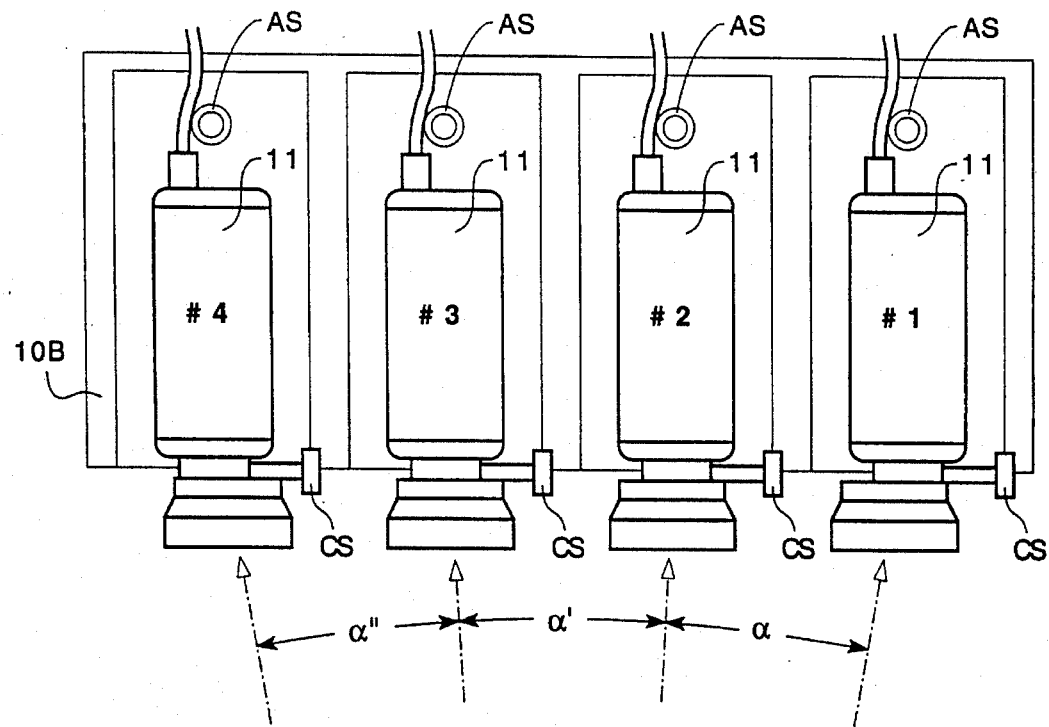
FIG. 11 is a plan view of the preferred camera array of this invention.
Figure 12:
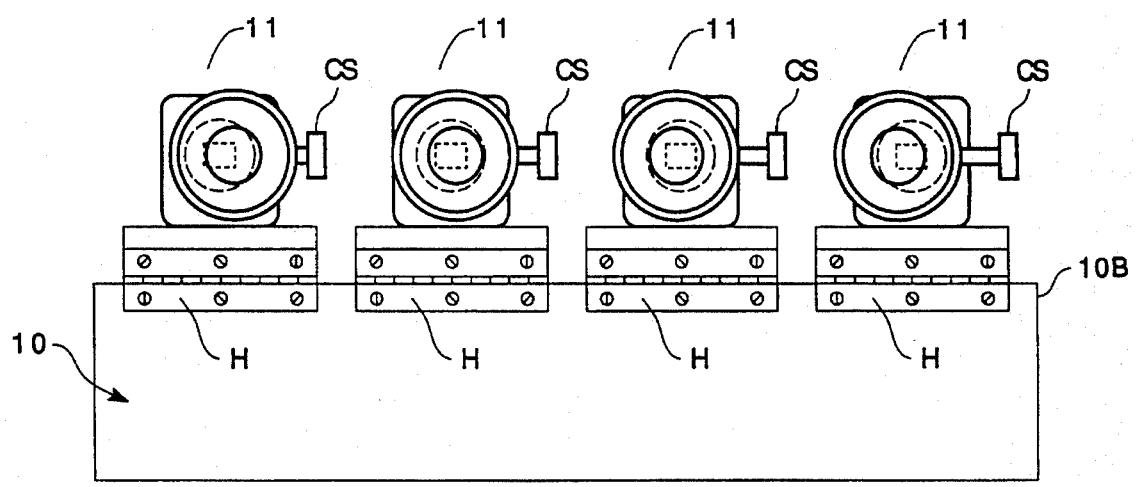
FIG. 12 is a front elevational view of the preferred camera array of this invention.

FIGS. 1, 11 and 12 show the camera array 10 with the individual cameras mounted in a mutually parallel configuration on base plate 10B. Convergence adjustment is provided to each camera, as shown in FIG. 1, by means of a shift lens and lateral convergence adjustment knob CS. The lenses are adjusted laterally inward so that the optical center lines of the lenses converge on an object S in the scene, so that angles α, α' and α" at the cameras FIGS. 1 and 11, approximately match the viewing angles at the monitor, FIGS. 3 and 4. Suitable perspective control lenses are the PC lenses produced by the Nikon Camera Company of Japan. The use of perspective control lenses eliminates the need for YAW rotation of the camera. A tilt or pitch angle correction is made in the embodiment of FIGS. 1, 11 and 12 by the individual hinges H and the adjustment screws AS of FIGS. 1 and 11.

An alternate camera assembly 10a is shown in FIG. 1a. As shown, it is transportable in carrier 10c. The four cameras 11 are standard video cameras without perspective control lens assemblies. Instead, each camera 11 is mounted on a respective turntable TT which affords approximately ±10% of azimuth adjustment from an axial or straight ahead alignment. Each camera is locked by individual lock nuts LN in azimuth orientation with a convergence point in the field of view of the subject S.

Now, specifically referring to FIGS. 2–7, for an understanding of the monitor 24. Referring now to FIGS. 1, 2, 3 and 4, it may be seen therein that lenses 34a and 34d are located at a greater physical distance compared to lenses 34B and 34C from both the screen 42 of the liquid-crystal assembly 32, and to the display screen 26. The magnification of lenses 34a and 34d is identical to that of lenses 34b and 34c. The greater optical-path length of lenses 34a and 34d, compared to that of lenses 34b and 34c, is compensated for with the use of longer focal length lenses at 34a and 34d, as compared to lenses 34b and 34c. The dotted ray path from the liquid-crystal screen 32 to the entrance optics of lenses 34a and 34d is greater than the dashed ray path from the same screen to the lenses 34b and 34c.

Both sets of lens assemblies project the images S1 through S4 from the liquid-crystal screen 42 to the viewing screen 26 with the multiple images S1 through S4 all superimposed on the viewing screen 26.

In the embodiment of FIGS. 1–3, a single lamp 50 with its filament 50f is employed. However, individual lamps can be used, which corresponded to the number of images to be superimposed, as well as to the number of lens assemblies. The single lamp embodiment of FIGS. 1–3, 17 and 18 has the advantage of using less electrical current, producing less heat, and having the lamp life of a single lamp determining its reliability as compared to a multiple lamp embodiment in which the failure of any one lamp places the system at a less than acceptable level of performance. FIG. 3 shows the ray patterns from the lamp 50 through the multiple Fresnel lens 44, liquid-crystal assembly 32, through the lens assemblies 34a–34d, to the rear-illuminated viewing screen 26, in the monitor window, to the observer 0. The lamp 50, for example, a type 04468 produced by Abco of Japan and having an input of 150 watts is effective to providing a sufficient light level from each of the lens assemblies 34a–34d over the entire rear screen 26. The lamp 50 and the multiple (4) patterns on the Fresnel lens plate 44 are best seen in FIG. 1. The cooperation of the lamp 50 and the Fresnel lens plate 44 produces images of the filament 50f at the entrance pupils of each projection lens 34a–34d.

The ray pattern from the projection lamp 50, to the observer O, is best seen in FIG. 3 in which the observer O, when located at the position of the projected exit pupils, views projected images of S which were photographed or otherwise produced at a subtended angle which tends to match the subtended angles α–α" of a screen as viewed by an observer O on the display screen 26.

Of importance to this invention is the screen 26 which is viewed by the observer O. It is a composite screen 26 best seen in FIGS. 5 and 8 made up of a number of layers. The outermost layer 60 (nearest to the observer) as seen in FIGS. 5 and 8 is a transparent neutral gray tinted film which is used to improve image contrast in adverse ambient lighting conditions. The second layer is a lenticular screen 62 with the lenticules L extending laterally (horizontally) to spread "hot spots" vertically. The screen 26 is located behind an aperture in the front wall of monitor 24 of FIG. 1 which aperture defines the screen size. In the prototype, a lenticular screen with 142 lines/inch, model 260, made by Fresnel Technologies of Ft. Worth, Tex., was used at the screen.

The third layer of the screen 26 of FIGS. 5 and 8 is a diffusing screen 63 of non glare picture glass or plastic to increase the size of the projected exit pupils. The diffuser used in the prototype has a diffusion coating only on the surface of transparent plastic, however an alternate diffuser can have the diffusion material mixed homogeneously through the material. The fourth and last layer is a Fresnel field lens 64 which is designed to take diverging light from the projection lenses 34a–34d, and to converge it into the eyes of the observer O. The screen 26 provides a 3-D image in a range of positions as indicated by the double headed arrows in FIG. 2.

The equation for the determination of the focal length of the Fresnel lens is:

$$1/FL = 1/K + 1/S'_{avg}. \qquad (2)$$

Where:

FL=focal length of Fresnel lens 64;

K=front conjugate from Fresnel lens to observer's eyes to be a comfortable viewing distance, approx. 22 inches;

$S'_{avg.}$=average distance from Fresnel lens to projection lenses 34a–d.

Of course where sufficient room is available, a conventional convex lens of the same focal length may be substituted for the Fresnel lens 64.

This invention may be even more enhanced by the increase in number of images from the minimum of two as illustrated on FIG. 13, to a practical maximum of 13 as illustrated in FIG. 16. An optimum arrangement would be with 7 images which are reproduced and displayed on the liquid-crystal display panel 42 is illustrated in FIG. 15.

Figure 17:
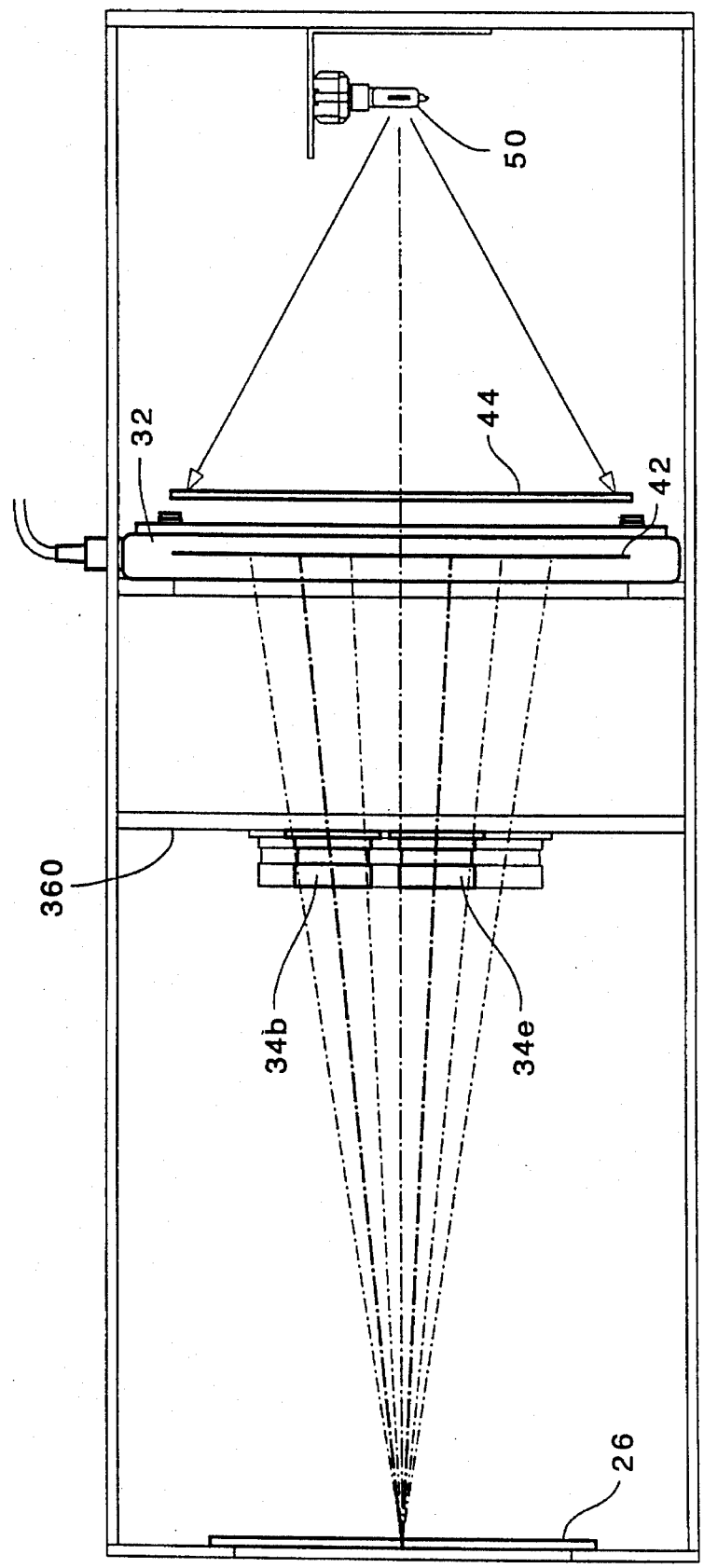
FIG. 17 is a top plan view of a seven-lens and seven-image version of the monitor of FIG. 1 with the cover removed and illustrating optical center lines to the viewer.
Figure 18:
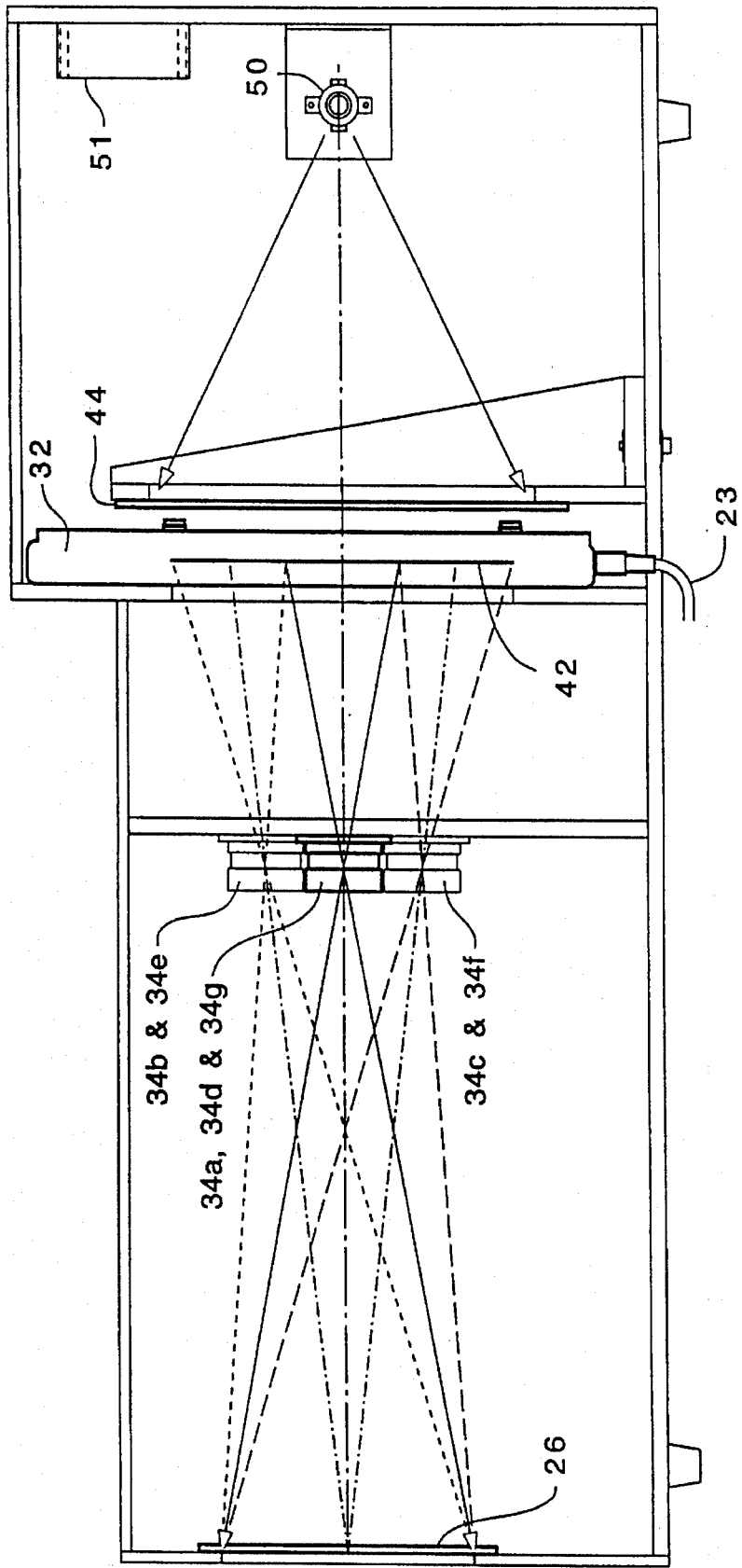
FIG. 18 is a side elevational view of the monitor of FIG. 6 with the housing side removed.

The enhanced physical embodiment utilizing 7 images is illustrated in FIGS. 17 and 18. In this case the liquid-crystal panel 32 of FIG. 1 with its multiple image plane 42 is divided into three horizontal rows of images, each having different horizontal positions, as illustrated in FIG. 15 with the upper row having images 2 and 5, the middle row including images 1, 4 and 7 and the lower row positioning images 3, and 6, all having different lateral displacements. The image arrangement is chosen appropriate to match the lens system and to combine the images on the screen 26 to correspond to the original images from whichever source is used such as camera array 10.

Where three sources are used, FIG. 14 shows a way to utilize the liquid-crystal image panel 42. If only two sources are used, the liquid crystal panel image would look like FIG. 13. In each case of FIGS. 13 through 16, the cross lined areas of the liquid-crystal screen are unused.

As can be seen in the 4 image (2×2) array 42 of FIG. 1, the liquid-crystal panel 42 is most efficiently utilized, being fully used. In each case, the Fresnel field lens 44 behind the liquid-crystal assembly 32 has lens sections which match the image pattern used to spread illumination from lamp 50 to the liquid-crystal image panel 42 for each image.

The arrangement of FIGS. 17 and 18 provides more views of the subject S than the embodiment of FIG. 1 and therefore more natural transitions in horizontal parallax as the observer's head moves laterally, or the larger number of observers may view the monitor at the same time. FIGS. 17 and 18, all images are projected directly without any folded optics, as is used in the embodiment of FIGS. 1–7, and all lenses in FIGS. 17 and 18 are of the same focal length and are mounted on a common flat panel 360, thereby simplifying design, manufacture and maintenance.

One reason for the ability to produce this enhanced embodiment is the recent introduction of high resolution liquid-crystal projection panels such as the 10.4 in. diagonal Sharp Electronics Super VGA model LQ10PX01 display which has 768 by 1024 image resolution. This screen allows the production of seven images in three rows of 256 by 341 resolution, each.

Similar to the previous embodiment, the system of FIGS. 17–18 includes a Fresnel field lens 64 and an lenticular screen 62 of FIG. 8. The Fresnel lens 64 projects exit pupils from each projection lens into the viewing space and provides uniform screen illumination when the eye of the observer O is within the projected exit pupil.

Also similar to the previous embodiments, the lenticular projection screen 62 is positioned with the lenticules oriented laterally to spread the illumination vertically without spreading the illumination laterally or contaminating the stereo views. This feature relaxes the requirement of the vertical positioning of the observers head and creates a tall area at a comfortable viewing distance of uniformly illuminated images even though the projection lenses are staggered. FIGS. 19 and 20 illustrate this vertical spreading of the exit pupils at the observer's eyes.

FIG. 19 illustrates the exit pupils at the eyes of the observer, projected by the screen optics (the lenticular screen 62 and the Fresnel lens 64) of the projection lenses, in the 4-lens version of the monitor of FIG. 1.

FIG. 20 illustrates the exit pupils at the eyes of the observer, projected by the screen optics (the lenticular screen 62 and the Fresnel lens 64) of the projection lenses, in the 7-lens version of the monitor of FIGS. 17 and 18.

The increased number of images can be exploited to create a minimum of jumping of images when moving the head laterally. Altogether each of these embodiments allow comfortable viewing of stereo images without the need to wear glasses or other appurtenances. The system does not require the observer to maintain his head at a fixed position in order to view a stereo image. Typical angles of illumination are as follows:

| Vertical Direction | ±20 degrees |
|---|---|
| Horizontal Direction | ±11 degrees |

The use of four, seven or more, rather than the usual two stereo images, adds to the realism of the view, gives the observer some look-around capability to confirm the roundness of objects.

Figure 21:
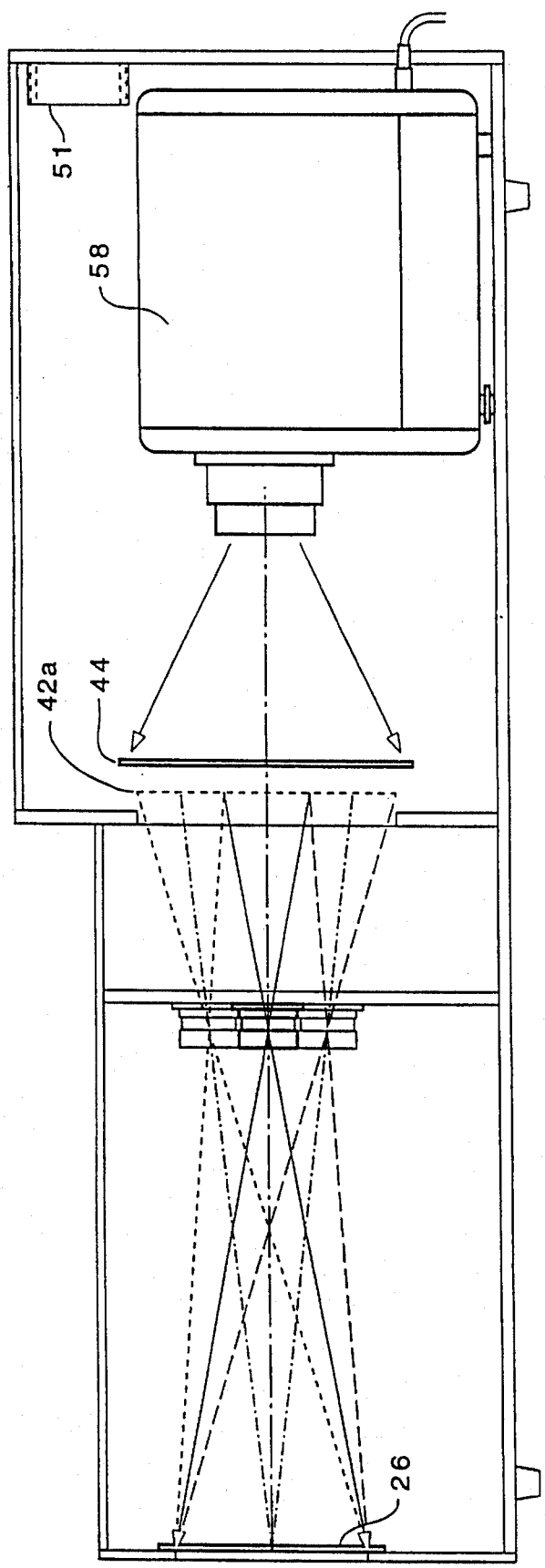
FIG. 21 is a side elevational view of the monitor of this invention with a video or optical film projector substituted for the liquid crystal display and light source of the previous embodiments.

The examples shown are the best mode known to the inventor to carry out this invention. Using known production design technology, the overall size of the optic system may be reduced by folding the entire optical path one or more times with mirrors and by the use of wide angle projection lenses. In a further understanding of the use and scope of this invention, reference is now made to FIG. 21. In this embodiment, the liquid crystal assembly 32 has been eliminated as the image source and its illuminating lamp 50, as well. In the rear chamber 45, a video projector 58 has been placed with its lens directed to project a multiple image scene onto the multiple lens 44 for display on a conventional rear projection screen 42a or an aerial multiple image plane which substitutes for the screen 42 of the liquid crystal display 42 of the liquid crystal assemblies 32 employed in the previous embodiments. The combined video signals for the projector 58 are received over the lead 23 as in the previous embodiments. It should also be understood, that a conventional film projector may be used in place of the video projector 58 with the film used having recorded images of the types shown on FIGS. 1 and 13–16.

Figure 22:
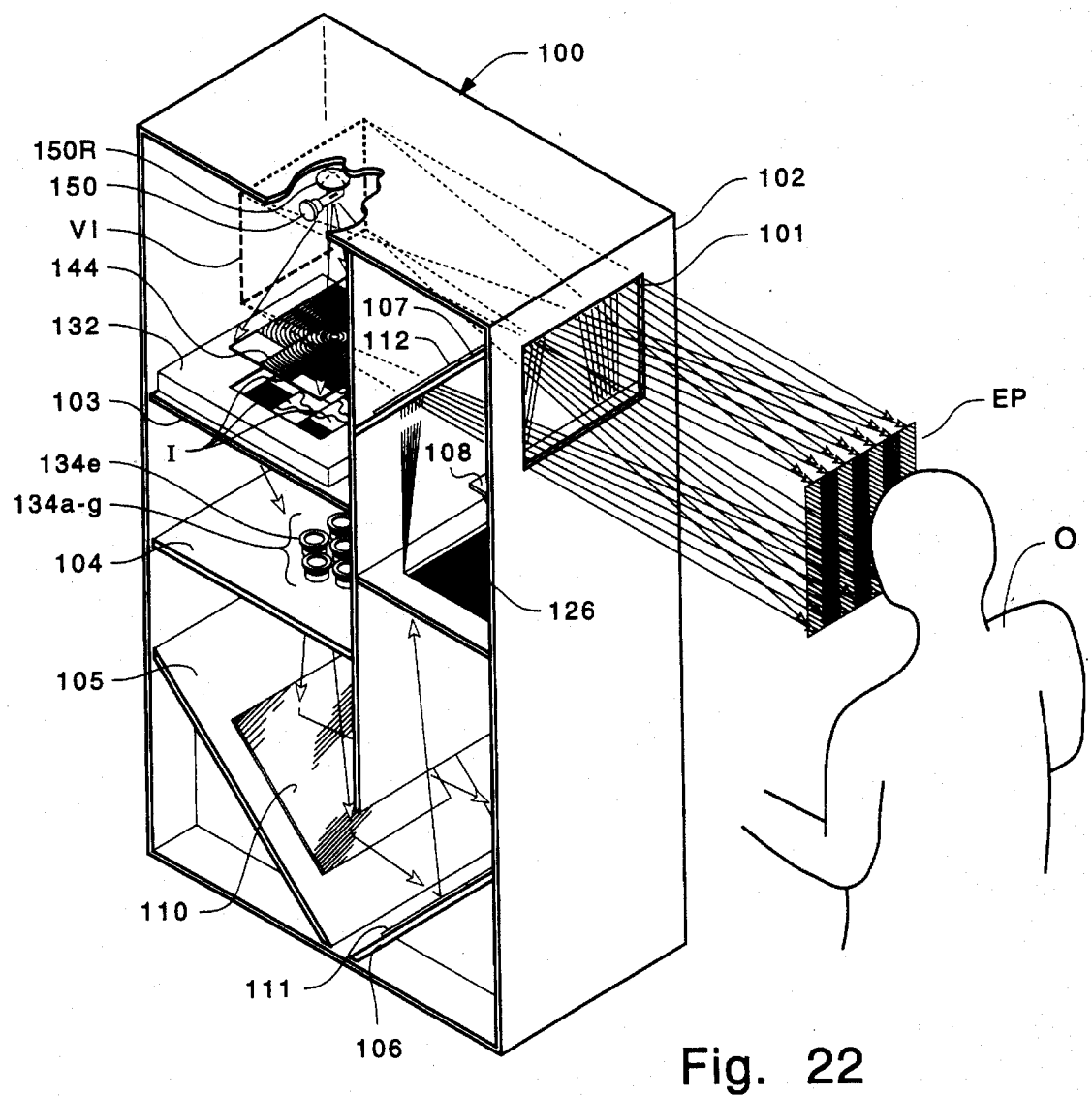
FIG. 22 is a perspective view of the improved version of my invention with the left side removed for viewing of portions of the system.
Figure 23:
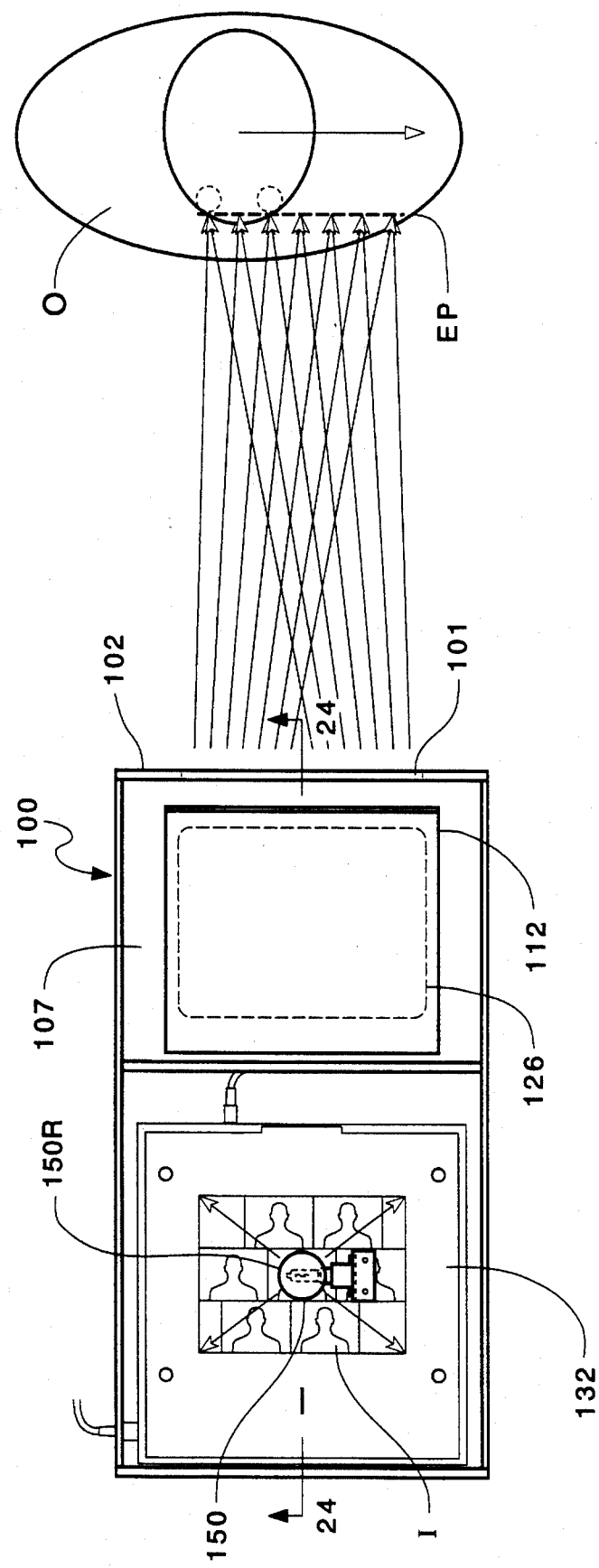
FIG. 23 is a top plan view thereof with the cover removed for viewing parts of the system.
Figure 24:
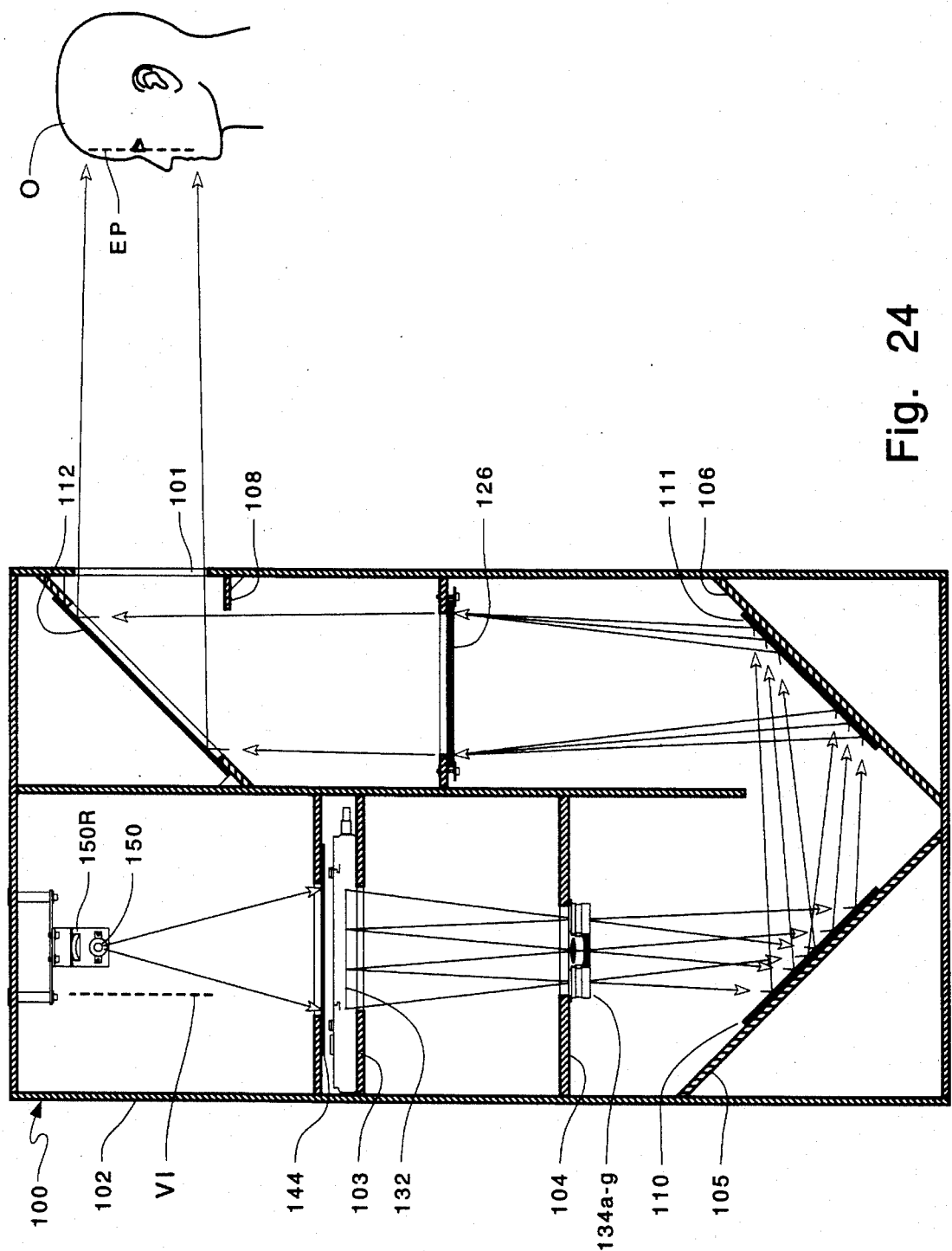
FIG. 24 is a vertical sectional view taken along lines 24—24 in FIG. 23 to show the light paths and relative positions of the elements of the system.
Figure 25:
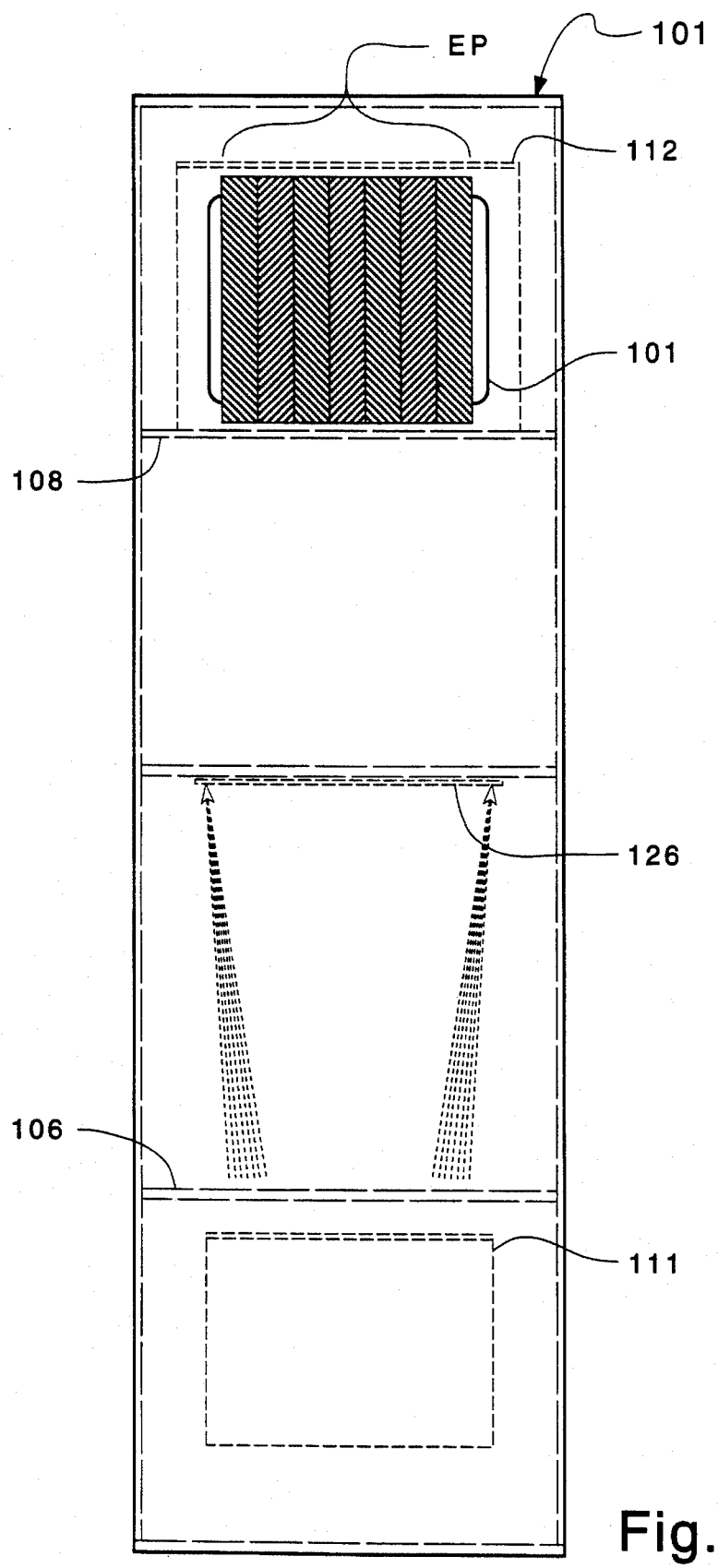
FIG. 25 is a front elevational view of the system of FIG. 22 with the hidden parts and light rays shown as dashed lines.
Figure 26:
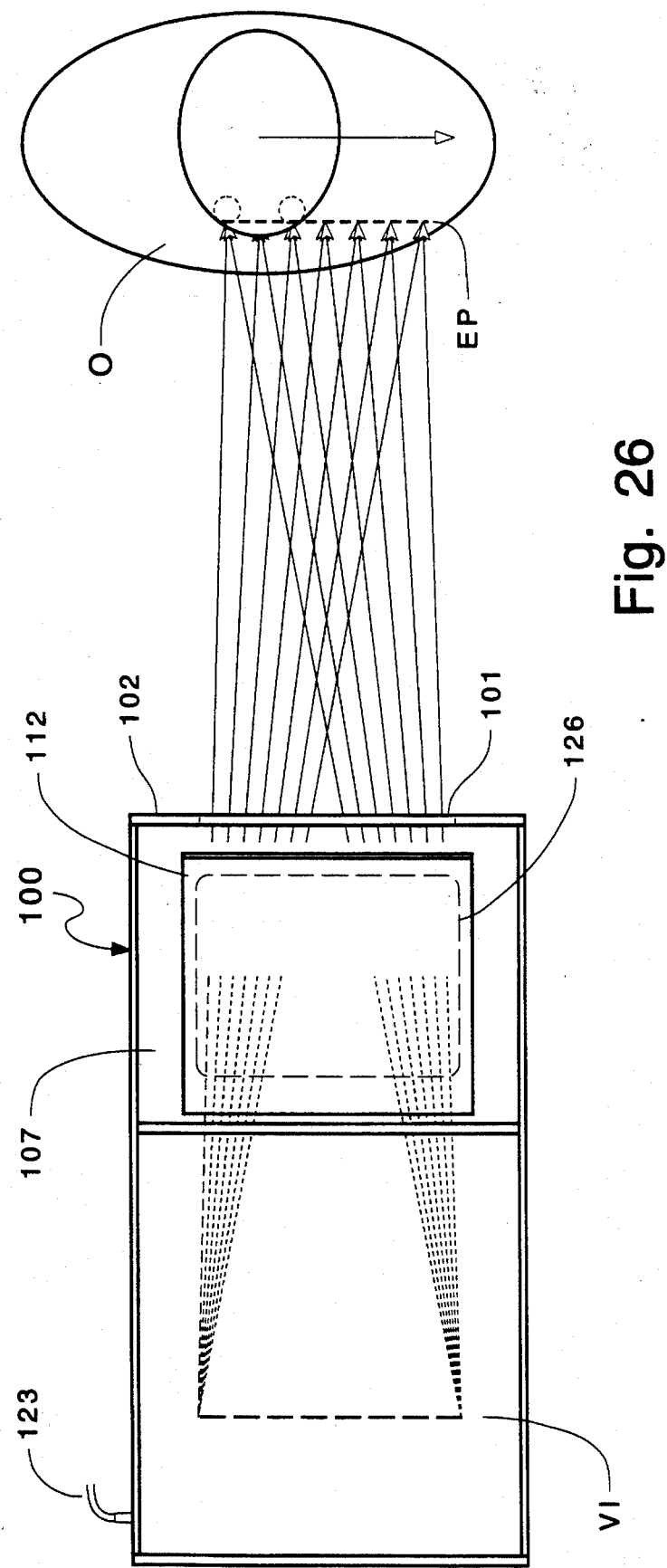
FIG. 26 is a simplified top plan view of the system of FIG. 22 showing the light paths and projected exit pupils.

Now referring to FIG. 22 in conjunction with FIGS. 23–26, the improved viewing system 100 of this invention may therein be seen. An observer O views the three dimensional (3-D) image through opening 101 in the front face of the housing 102 of the system. Contained within the system housing 102 may be found are one or more light sources 150 best seen in FIG. 24. In the preferred embodiment, one lamp 150 and its reflector 150R is present for each image to be displayed.

In a seven-image system, as illustrated in FIG. 22, lamp 150 and its reflector 150R directs light toward multi-section field lens 144 which is positioned to direct light from lamp 150 through the seven individual respective fresnel lens sections and through an LCD display screen 132 similar to screen 32 of the earlier embodiments. The LCD display 132 is positioned on apertured platform 103 so that light which illuminates each individual image continues to respective lenses 134a–134g which are positioned in a flat array on the lens support platform 104. Note that the lens 134a–134g are all positioned on common flat surface 104 at the same distance from the LCD screen 132 without any folded optics in this portion of the optical path. Therefore, the lenses 134a–134g may be identical and interchangeable.

Each lens, such as 134a, directs light toward a first mirror 110 located on a forty-five degree positioned platform 105. Each of the out of focus images, directed toward mirror 110, overlap with lateral and vertical displacement corresponding to the relative displacement on the LCD display screen 132.

The various images are then reflected by mirrors 110 and 111 to screen 126. One further reflection by a third forty-five degree angled mirror 112 on its platform 107 reflects the seven stereoscopic images to the observer O through the viewing opening 101. The images appear to the observer as being located nominally at the virtual image plane VI. A baffle 108 located at the inside front wall, below opening 101, minimizes any ambient light from reaching the display screen 126.

Owing to the three reflections by mirrors 110, 111 and 112, three image reversals are encountered. Therefore the image as supplied via the cable 123 of FIG. 23 should be reversed in well known electronic practice.

The compactness of the system should be readily apparent since the full size image is folded in the vertical direction whereby the system need not have as much depth as in the embodiment of FIGS. 1–21. Likewise the observer naturally directs his attention to the viewing opening 101 and does not expect to view an image if his head placement is outside of the volume EP defined by the opening 101 and the edges of the image on the mirror 112. By restricting the angle of view in this manner, the observer O will not encounter positions where the three dimensional view momentarily disappears or the screen appears blank. That can occur if the observer's eyes depart from the limits of viewing space in my previous embodiment.

Instead, the observer O may move vertically while maintaining an illuminated image, and laterally and observe natural smooth transitions while maintaining the stereoscopic effect and observing limited look-around ability and motion parallax.

The foregoing embodiments are merely illustrative of the principles of this invention and are not to be considered as limiting. This invention, instead, is defined by the following claims including the protection afforded by the Doctrine of Equivalents.

What is claimed is:

1. A system for producing and displaying 3-D images for an observer or observers without the use of viewing glasses, comprising:

a source of multiple images corresponding to the 3-D images of a scene to be displayed;

a device for displaying the multiple images on discrete portion of a display screen;

means for illuminating the multiple images on said display screen;

an optical system including respective lenses for each of said image projecting from their respective corresponding positions on the display screen for superimposing said images on a common viewing screen to create superimposed images;

reflective means for directing said superimposed images toward the observer;

a housing for said system including a viewing window therein;

said reflective means directing said superimposed images toward said viewing window;

said viewing window being dimensioned relative to the superimposed images as projected by said reflective means to restrict the viewing angle so that the superimposed images provide a 3-D effect to the observer.

2. A system in accordance with claim 1 wherein said optical system includes a plurality of substantially identical lenses for imaging the respective images on a viewing screen which, with the aid of a mirror, is exposed to said viewing opening.

3. A system in accordance with claim 2 wherein said optical system includes a pair of reflective surfaces following said lenses, said reflective surfaces providing a folded image path.

4. A system in accordance with claim 2 wherein each of said lenses comprises a unitary multi section lenticular lens including one section for each image for directing light from said light source to each of the images on said display screen.

5. A system in accordance with claim 3 wherein said viewing screen follows said pair of reflective surfaces in the image path to the observer.

6. A system in accordance with claim 5 including an additional reflective means, positioned to direct the final image through the viewing window of said housing for viewing by the observer.

7. A system in accordance with claim 5 wherein said housing defines an opening therein through which the observer may view the final image with a controlled viewing area.

8. A system for displaying, for observers, 3-D images formed from multiple discrete images representing laterally displaced views of a common scene comprising:

display means for producing individual multiple images in a predetermined arrangement;

a viewing screen;

light source for projecting said images for display on said viewing screen;

individual lens means for each of said images positioned between said display screen and said viewing screen for superimposing said multiple images on said viewing screen in positions corresponding to the position of said multiple images as originally laterally displaced in said common scene;

reflective means between said lens means and said viewing screen for directing said superimposed multiple images to a horizontal direction for viewing by the observers; and said system further including housing means for containing said system including a viewing opening wherein said reflective means directs the multiple superimposed images for viewing through said viewing opening.

9. A system in accordance with claim 8 wherein said display means, light source and individual lens means are vertically arranged within said housing and said reflective means is oriented to reflect said superimposed images to a horizontal orientation.

10. A system in accordance with claim 8 wherein the housing defining said viewing opening restricts the vertical and horizontal limits of the exit pupil of said superimposed multiple images.

11. A system in accordance with claim 8 wherein said reflective means comprises folded optics for reversing the direction of said superimposed images and for directing said superimposed images to a position for viewing by observers through said viewing opening.

* * * * *